(12) United States Patent
Kim

(10) Patent No.: US 10,324,560 B2
(45) Date of Patent: Jun. 18, 2019

(54) APPARATUS OF DISPLAY HAVING DETACHABLE LAYER AND METHOD OF MANUFACTURING THE DISPLAY

(71) Applicant: Young Su Kim, Suwon-si (KR)

(72) Inventor: Young Su Kim, Suwon-si (KR)

( * ) Notice: Subject to any disclaimer, the term of this patent is extended or adjusted under 35 U.S.C. 154(b) by 172 days.

(21) Appl. No.: 15/259,561

(22) Filed: Sep. 8, 2016

(65) Prior Publication Data

US 2016/0378246 A1 Dec. 29, 2016

Related U.S. Application Data

(63) Continuation of application No. PCT/KR2015/012977, filed on Dec. 1, 2015.

(30) Foreign Application Priority Data

Jan. 20, 2015 (KR) .......................... 10-2015-0009111

(51) Int. Cl.
*G09G 5/00* (2006.01)
*G06F 3/041* (2006.01)
(Continued)

(52) U.S. Cl.
CPC .............. *G06F 3/0416* (2013.01); *B32B 7/06* (2013.01); *B32B 7/12* (2013.01); *B32B 9/045* (2013.01);
(Continued)

(58) Field of Classification Search
CPC ........... G06F 3/044; G06F 2203/04103; G06F 3/0416; G06F 2203/04102;
(Continued)

(56) References Cited

U.S. PATENT DOCUMENTS

2011/0043981 A1 2/2011 Johnson et al.
2012/0026112 A1 2/2012 Seok et al.
(Continued)

FOREIGN PATENT DOCUMENTS

JP 4493273 6/2010
JP 2011065137 3/2011
(Continued)

OTHER PUBLICATIONS

International Search Report—PCT/KR2015/012977 dated Mar. 7, 2016.

*Primary Examiner* — Jennifer T Nguyen
(74) *Attorney, Agent, or Firm* — Cantor Colburn LLP

(57) ABSTRACT

Provided is a display device having a detachable layer and a method for manufacturing the same that are capable of easily exchanging a damaged window or touch screen with new one, simply separating a window or touch screen therefrom, and providing a simple manufacturing process, a low manufacturing cost, and various designs. The display device includes: a window structure having a detachable layer formed on the entire surface of one side of a window, the detachable layer having the adhesion strength in the range of 0.1 to 500 gf/25 mm; and an attachment target device from which the detachable layer of the window structure is entirely detachable, wherein the attachment target device is any one selected from a touch screen, a touch screen cover layer, and a display.

19 Claims, 8 Drawing Sheets

(51) Int. Cl.
   *B32B 7/12*      (2006.01)
   *B32B 27/06*     (2006.01)
   *B32B 9/04*      (2006.01)
   *B32B 27/28*     (2006.01)
   *B32B 27/30*     (2006.01)
   *B32B 27/32*     (2006.01)
   *B32B 27/36*     (2006.01)
   *B32B 7/06*      (2019.01)
   *B32B 17/06*     (2006.01)
   *G02F 1/13*      (2006.01)
   *G02F 1/1333*    (2006.01)

(52) U.S. Cl.
   CPC ........... *B32B 17/064* (2013.01); *B32B 27/06* (2013.01); *B32B 27/28* (2013.01); *B32B 27/281* (2013.01); *B32B 27/286* (2013.01); *B32B 27/308* (2013.01); *B32B 27/325* (2013.01); *B32B 27/36* (2013.01); *G02F 1/1309* (2013.01); *G06F 3/041* (2013.01); *G06F 3/0412* (2013.01); *B32B 2255/10* (2013.01); *B32B 2255/20* (2013.01); *B32B 2255/26* (2013.01); *B32B 2255/28* (2013.01); *B32B 2307/202* (2013.01); *B32B 2307/412* (2013.01); *B32B 2457/208* (2013.01); *G02F 1/13338* (2013.01); *G02F 2001/133331* (2013.01); *G02F 2202/28* (2013.01); *G06F 2203/04102* (2013.01); *G06F 2203/04103* (2013.01)

(58) Field of Classification Search
   CPC ......... H03K 2217/96031; H03K 2217/96075; G02F 2202/28
   USPC .................................................. 345/173–178
   See application file for complete search history.

(56)    References Cited

U.S. PATENT DOCUMENTS

| | | | |
|---|---|---|---|
| 2013/0004749 A1 | 1/2013 | Hao et al. | |
| 2013/0230680 A1 | 9/2013 | Cheng | |
| 2013/0316133 A1 | 11/2013 | Kim | |
| 2014/0306187 A1* | 10/2014 | Kim | ........ C09J 129/04 257/40 |
| 2015/0370395 A1* | 12/2015 | Hsu | ........ G06F 3/0412 345/174 |
| 2016/0031106 A1 | 2/2016 | Wu et al. | |
| 2016/0159052 A1* | 6/2016 | Kim | ........ B32B 27/08 361/679.01 |

FOREIGN PATENT DOCUMENTS

| | | |
|---|---|---|
| JP | 2012088946 | 5/2012 |
| JP | 2012098687 | 5/2012 |
| JP | 2012098732 | 5/2012 |
| JP | 2012238467 | 12/2012 |
| JP | 2013242567 | 12/2013 |
| JP | 2014164185 | 9/2014 |
| JP | 3194930 | 12/2014 |
| JP | 2014224919 | 12/2014 |
| KR | 20120023062 | 3/2012 |
| KR | 20120091962 | 8/2012 |
| KR | 20140028890 | 3/2014 |
| KR | 20140079783 | 6/2014 |
| KR | 20140085259 | 7/2014 |
| WO | 2012151734 | 11/2012 |
| WO | 2016117820 | 7/2016 |

* cited by examiner

APPARATUS OF DISPLAY HAVING DETACHABLE LAYER AND METHOD OF MANUFACTURING THE DISPLAY

CROSS-REFERENCE TO RELATED APPLICATION

This application is a continuation of PCT Patent Application No. PCT/KR2015/012977 filed on Dec. 1, 2015, which claims priority to and the benefit of Korean Patent Application No. 10-2015-0009111 filed on Jan. 20, 2015, and the entire disclosures of which are incorporated herein by reference.

BACKGROUND OF THE INVENTION

Field of the Invention

The present invention relates to a display device and a method for manufacturing the same, and more particularly, to a display device having a window or touch screen detachably attached thereto and a method for manufacturing the same.

Background of the Related Art

A display device forms a screen through a display like a liquid crystal display LCD, an organic light-emitting diode OLED, and an electronic paper display EPD. The display device is applied to all kinds of video screen devices. On the other hand, the display device is provided with a touch screen so as to improve the conveniences in manipulation. Further, a window, which is made of tempered glass or transparent polymer resin, is disposed on the front surface of the touch screen. The window is divided into a display portion and a bezel portion along which edges are printed, thereby protecting the display device from the damages caused by external impacts or contacts. The window is attached fixedly to the touch screen by means of an OCA (Optical Clear Adhesive) or ultraviolet curing adhesive. Recently, a flexible and bent display has been introduced so that a window corresponding to the display appears.

FIGS. 1 and 2 are schematic sectional views showing representative examples of conventional display devices in which touch screens are adopted. At this time, the display devices include bent devices as well as flat devices as shown.

As shown in FIGS. 1 and 2, the conventional display devices are configured wherein a touch screen 2 and a window 3 are laminated sequentially on a display 1 like an LCD or OLED. An adhesive layer 4 is formed on both of the space between the display 1 and the touch screen 2 and the space between the touch screen 2 and the window 3 (See FIG. 1). Otherwise, as shown in FIG. 2, the touch screen 2 and the window 3 are attached to each other by means of the adhesive layer 4. The display device as shown in FIG. 2 has a conductive pattern (not shown) of the touch screen 2 formed on the display 1. The conventional window 3 has a high hardness, and among the whole parts of the display device, the window 3 has a relatively high price.

The conventional display device manufactured through the adhesion has the following problems. Firstly, if the window 3 or the touch screen 2 is damaged, it is difficult to exchange it with new one. Especially, an operation for exchanging the window 3 or the touch screen 2 in the display device is frequently conducted. So as to conduct the exchanging operation, first, the damaged window 3 or touch screen 2 is removed from the display device. Next, a new window 3 or touch screen 2 is manufactured, and so as to allow the new window 3 or touch screen 2 to be attached to the new touch screen 2 or the display 1, an adhesive is applied to any one surface of the new window 3 or touch screen 2. This operation cannot be conducted at all by a consumer.

Further, the adhesive layer 4 has the adhesion strength of more than about 1,000 gf/25 mm, and typically, it has the adhesion strength of more than 1,500 gf/25 mm. Further, the adhesive layer 4 generally has a thickness in the range of 10 to 200 μm. It is hard for the consumer to remove the adhesive from the window 3 or the touch screen 2, without having any remaining materials thereon. Accordingly, the exchanging operation for the damaged window 3 or touch screen 2 should be conducted in a place where the exchanging equipment exists. If the consumer contacts a service center of the manufacturing company of the display device and thus sends the damaged display device to the service center, the damaged window 3 or touch screen 2 is exchanged with new one through the service center having the exchanging equipment, and thus, the repaired display device is sent back to the consumer. Therefore, the damaged window 3 or touch screen 2 cannot be easily exchanged by the consumer, and a relatively long period of time is needed to complete the exchanging of the display device.

Secondly, it is not easy to recycle the display device due to the existence of the adhesive layer 4. Recently, it becomes important to recycle the display device. So as to recycle the display device, the window 3 or the touch screen 2 has to be separated from the display device. For such separation, the display device is heated to soften the adhesive layer 4, and next, the window 3 or the touch screen 2 is separated from the display device by means of a wire. Otherwise, the display device is momentarily cooled by means of liquid nitrogen, and then, the window 3 or the touch screen 2 is separated from the display device. So as to recycle the display device, that is, additional cost and time for separating the window 3 or the touch screen 2 from the display device are required, which is not economical.

Thirdly, an adhesion process with no air bubbles is needed in manufacturing the conventional display devices. If there are no air bubbles, a refraction ratio and a reflection ratio are minimized, thereby improving the luminance of the display device. A process for removing the air bubbles becomes complicated by means of the adhesive layer 4. In more detail, the adhesive layer 4 is formed uniformly by means of injection, and next, air bubbles are removed from the adhesive layer 4 by means of close contact and pressure reduction. After that, the adhesive layer 4 is cured through ultraviolet rays. The adhesive layer 4 has to have no air bubbles, and accordingly, the formation of the adhesive layer 4 is conducted very precisely. Therefore, the conventional display devices are manufactured with relatively high-priced manufacturing equipment, thereby raising the manufacturing cost thereof. Furthermore, adhesion with air bubbles often occurs in the conventional display devices, thereby also raising a failure rate.

Lastly, the conventional display devices do not satisfy the consumer's desires to obtain various and excellent designs in shapes, colors and patterns. A variety of products, complicated manufacturing process, and high manufacturing cost become obstacles to the satisfaction of the consumer's desires. Further, if the display device is manufactured with various designs, after services for the respective designs should be conducted one by one by the manufacturing company of the display device. In conventional practices, accordingly, the window 3 is designed only with a single color like black and white.

SUMMARY OF THE INVENTION

Accordingly, the present invention has been made in view of the above-mentioned problems occurring in the prior art, and it is an object of the present invention to provide to a display device having a detachable layer and a method for manufacturing the same that are capable of easily exchanging a damaged window or touch screen with new one, simply separating a window or touch screen therefrom, and providing a simple manufacturing process, a low manufacturing cost, and various designs.

To accomplish the above-mentioned object, according to a first aspect of the present invention, there is provided a display device having a window, a touch screen, and a display, the display device including: a window structure having a detachable layer formed on the front surface of one side of the window, the detachable layer having the adhesion strength in the range of 0.1 to 500 gf/25 mm; and an attachment target device from which the detachable layer of the window structure is entirely detachable, wherein the attachment target device is any one selected from the touch screen and a touch screen cover layer, and the touch screen or the touch screen cover layer has an adhesion reduction layer formed thereon.

According to the first aspect of the present invention, desirably, the window is any one selected from a glass substrate and a plastic substrate. In more detail, the window is any one selected from a tempered glass substrate and a plastic substrate having any one or more selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer).

According to the first aspect of the present invention, desirably, the detachable layer is any one selected from an adhesive made by mixing thermosetting resin or ultraviolet curing resin as acrylic polymer, silicone polymer, or urethane polymer with a cross-linking agent, a mixture thereof, and a copolymer thereof. The detachable layer is a single layer or multiple layers having different materials from each other.

According to the first aspect of the present invention, desirably, the touch screen is a conductive pattern formed directly on the display. The conductive pattern of the touch screen is formed directly on the touch screen cover layer. Further, the touch screen is formed by forming a conductive pattern directly on the display, and the touch screen cover layer is located on the top of the display. The touch screen cover layer is any one selected from a tempered glass substrate, an untempered glass substrate, and a plastic substrate having any one or more selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer).

According to the first aspect of the present invention, desirably, the adhesion reduction layer is coated with a fluorocarbon resin or silicone resin by means of a wet or dry process. Further, the adhesion reduction layer is formed with a vacuum deposition layer made of titania $TiO_2$ or silica $SiO_2$ and a fluorocarbon resin or silicone resin coated on the vacuum deposition layer.

According to the first aspect of the present invention, desirably, through the formation of the adhesion reduction layer, the window structure has the adhesion strength, desirably, in the range of 0.5 to 500 gf/25 mm, and more desirably, in the range of 1 to 100 gf/25 mm. Further, the window structure is designed diversely in shape, color and pattern.

To accomplish the above-mentioned object, according to a second aspect of the present invention, there is provided a method for manufacturing a display device, the method including the steps of: removing a release film from a window structure having a detachable layer formed on the front surface of one side of the window, the detachable layer having the adhesion strength in the range of 0.1 to 500 gf/25 mm, and exposing the detachable layer to the outside; and attaching the exposed detachable layer to the front surface of any one of a touch screen and a touch screen cover layer, According to the second aspect of the present invention, desirably, the method further includes the step of separating a damaged window structure attached to any one of the touch screen and the touch screen cover, before preparing the window structure. The window structure is attached in a manual operation, and the window structure is attached with no air bubbles. Further, before attaching the exposed detachable layer, an adhesion reduction layer is formed on the touch screen or the touch screen cover layer, and at this time, the detachable layer is entirely detachable from the adhesion reduction layer.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
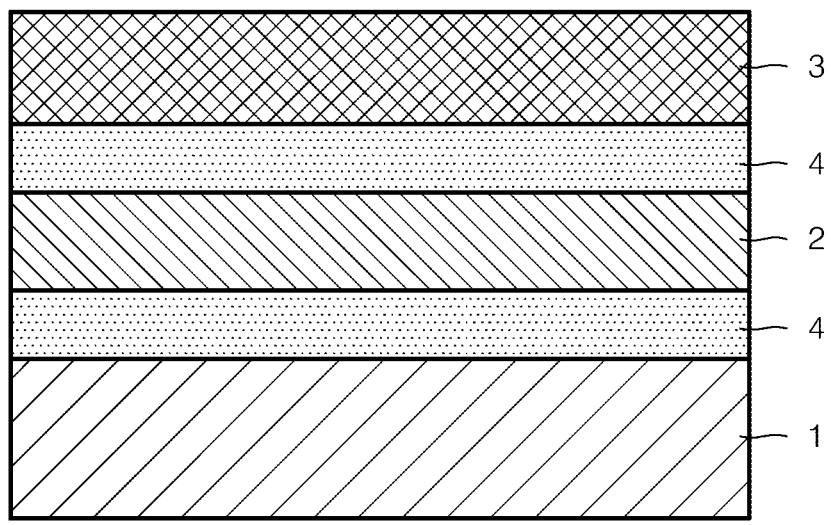
FIG. 1 is a schematic sectional view showing a conventional display device in which a touch screen is adopted.
Figure 2:
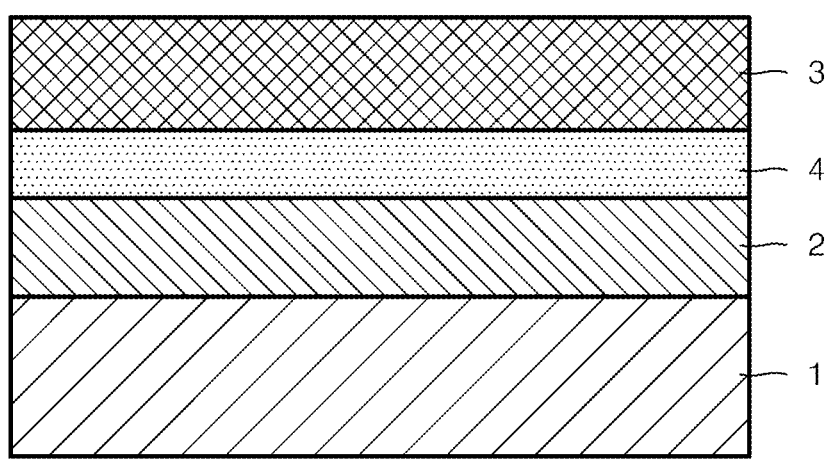
FIG. 2 is a schematic sectional view showing another conventional display device in which a touch screen is adopted.

Hereinafter, an explanation on a display device according to preferred embodiments of the present invention will be in detail given with reference to the attached drawing. Before the present invention is disclosed and described, it is to be understood that the disclosed embodiments are merely exemplary of the invention, which can be embodied in various forms. Therefore, the embodiments disclosed herein are provided to allow the present invention to be more perfectly appreciated by the person skilled in the art. In the description, the thicknesses of the films (layers or patterns) and the areas shown in the drawing may be magnified for the clarity and convenience of the description. Further, when it is said that one film (layer or pattern) is described as being disposed "on", "above", "under", or "on one surface" of the other film (layer or pattern), one film may be formed directly on the other film (layer or pattern), and otherwise, another film (layer or pattern) may be present between the two films.

A display device according to preferred embodiments of the present invention is configured wherein a window structure or a touch screen includes a detachable layer having the adhesion strength in the range of 0.1 to 500 gf/25 mm, so that when the window or touch screen is damaged, it can be easily exchanged with new one, the separation of the window or the touch screen is simple, and the display device is manufactured with simple processes, low manufacturing cost and various designs. At this time, the window structure or the touch screen has the detachable layer detachably attached to the touch screen or a display. Accordingly, an attachment target device to which the detachable layer is detachably attached has a relation with the touch screen or the display.

According to the present invention, the detachable layer is limited as detachable from the touch screen or the display, which is clearly different from a window protection film detachably attached to the window in conventional practices. That is, if the display device according to the present invention includes the display, without having the window or the touch screen, it is not a display device completely finished. The display device according to the present invention becomes the completely finished product when the window or touch screen adopted in the present invention is attached thereto. By the way, the conventional window protection film is attached to the top of the window, and accordingly, it is just attached to the display device already finished. The window or touch screen adopted in the present invention is a necessary component constituting the display device according to the present invention, but the conventional window protection film is an auxiliary component applied selectively to the display device.

The display device according to the present invention includes all video processing devices such as mobile devices, information processing terminals, televisions, and so on. The mobile devices include cellular phones, smart phones, tablets, and so on, and the information processing terminals include ATMs, kiosks, and so on. The display of the display device may be flat or bent, and also, it may be flexible. All video processing devices include windows, touch screens, and displays. Accordingly, the windows mean the windows of all video processing devices such as mobile devices, information processing terminals, televisions, and so on. In the same manner as above, the touch screens and the displays mean the touch screens and the displays of all video processing devices.

According to the present invention, the detachable layer has adhesion strength, desirably, in the range of 0.1 to 500 gf/25 mm, and more desirably, in the range of 1 to 100 gf/25 mm. In this case, since the adhesion strength of the detachable layer adopted in the present invention is smaller than the general adhesion strength of 1,500 gf/25 mm the conventional adhesion layer has, the detachable layer is distinguished from the adhesion layer in the conventional practices. In this case, the detachable layer adopted in the present invention is an adhesive that is optically transparent and cured by means of heat treatment or ultraviolet rays UV. If the adhesive is subjected to the heat treatment or UV treatment at a given temperature for a given period of time, it is cured to a semisolid state. The adhesion can be easily carried out in a manual operation by a consumer, while generating no air bubbles.

The detachable layer is diversely adopted within the technical scope of the present invention, and desirably, the detachable layer is any one selected from an adhesive made by mixing thermosetting resin or ultraviolet curing resin as acrylic polymer, silicone polymer, or urethane polymer with a cross-linking agent, a mixture thereof, and a copolymer thereof. In some cases, the detachable layer is mixed with functional materials like silica gels, nano-particles, and anti-static agents, thereby improving the physical properties thereof. Furthermore, quantum dots are added to the detachable layer, thereby improving the optical characteristics of the detachable layer.

Hereinafter, each of the detachable layer formed on the window structure having the window and the detachable layer formed on the window structure having the touch screen will be explained, independently of each other.

For the brevity of the description, the window structure is classified into first to fifth window structures detachably attached to the touch screen and the display. That is, the first to fifth window structures are detachably attached to the touch screen, the touch screen cover layer, and the display (hereinafter, referred also to attachment target devices). Hereinafter, the window structure will be explained in the state of being classified into the first to fifth window structures. According to the present invention, for example, the display devices are provided with the first to fifth window structures, but they may be provided with other window structures within the spirit and scope of the present invention. According to the present invention, the window structure is separately manufactured and detachably attached to one of the attachment target devices. At this time, the attachment of the window structure is conducted in a manual operation.

<Display Device Having a First Window Structure Detachably Attached to a Touch Screen>

Figure 3:
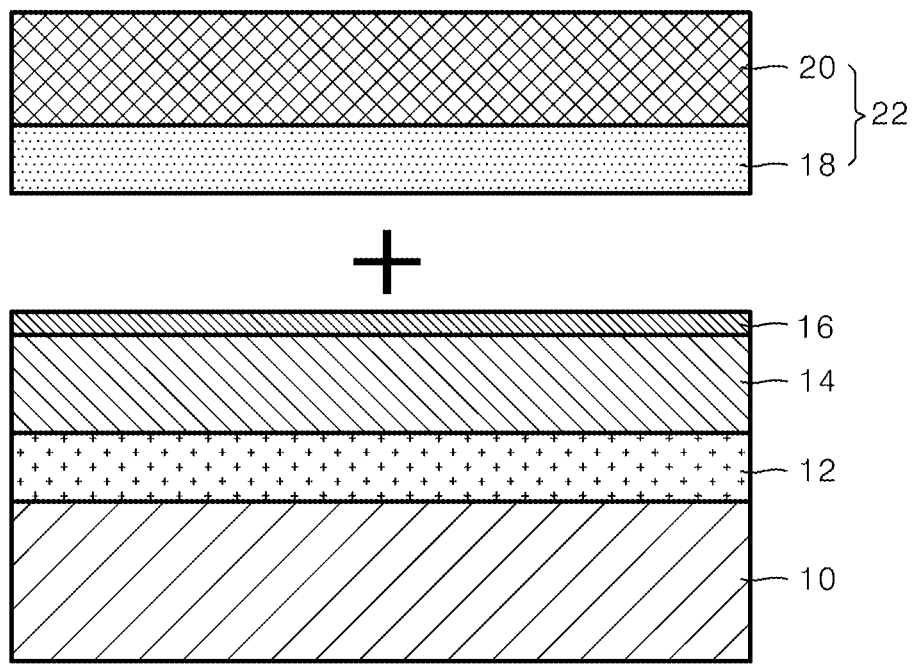
FIG. 3 is a schematic sectional view showing a display device according to a first embodiment of the present invention, wherein the display device has a first window structure detachably attached thereto.

FIG. 3 is a schematic sectional view showing a display device 100 according to a first embodiment of the present invention, wherein the display device 100 has a first window structure 22 detachably attached thereto. Of course, FIG. 3 is not an accurate sectional view showing the display device 100 according to the first embodiment of the present invention, and for the brevity of the description, further, the display device 100 may have components not indicated on the sectional view thereof.

As shown in FIG. 3, the display device 100 according to the first embodiment of the present invention includes a display 10, an adhesive layer 12, a touch screen 14, a detachable layer 18, and a window 20 sequentially laminated on one another. At this time, the first window structure 22 of the display device 100 includes the detachable layer 18 and the window 20. The display 10 is any one selected from a liquid crystal display LCD, an organic light-emitting diode OLED, and an electronic paper display EPD, and utilizes quantum dots. The adhesive layer 12 is selected from, for example, a thermosetting adhesive and an ultraviolet curing adhesive. However, the adhesive layer 12 is not limited thereto, and it may make use of OCA (optical clear adhesive). The touch screen 14 is made by forming a conductive pattern(s) on one side or both sides of an insulating layer made of a metal oxide or plastic. The insulation layer is generally made of the metal oxide such as ITO, ATO, ZnO, Cu, conductive polymer, and silver nanowire.

If the window 20 is made of a transparent material, it is not limited particularly. For example, the window 20 is any one selected from a glass substrate and a plastic substrate. In more detail, the glass substrate is a tempered glass substrate, and the plastic substrate is any one or more selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer). The window 20 may have a lamination structure in which the tempered glass substrate and the plastic substrate are multi-layered on each other.

The window 20 has a print layer, which is transparent or provides a variety of functions. The print layer includes any one or more coating layers selected from transparent, semi-transparent, and colored coating layers. The print layer is formed by means of silk printing, inkjet printing using UV, inkjet printing using thermosetting, or transferring. Further, the window 20 is coated thereon with a functional coating layer such as an anti-fingerprint coating layer, an anti-bacteria coating layer, a scratch prevention coating layer and the like. The functional coating layer is formed by means of wet coating through the application of a liquid thereto and dry coating through vacuum deposition. Further, various properties such as shielding, reflection prevention, blue light shielding, electromagnetic shielding, and privacy are applied to the underside of the glass substrate or the plastic substrate of the window 20. Furthermore, the window 20 has openings formed to expose buttons, a camera, a speaker, and so on to the outside.

The detachable layer 18 is detachably attached to the touch screen 14. If the detachable layer 18 is made of a transparent material, it is not limited particularly. The detachable layer 18 is any one selected from an adhesive made by mixing thermosetting resin or ultraviolet curing resin as acrylic polymer, silicone polymer, or urethane polymer with a cross-linking agent, a mixture thereof, and a copolymer thereof. The detachable layer 18 is a single layer or multiple layers having different materials from each other. The multiple layers are made of appropriate materials in accordance with the use environments of the detachable layer 18. The detachable layer 18 has a given thickness desirably in the range of 10 to 200 μm so that it can be attached well to the touch screen 14. Of course, it is obvious that the thickness of the detachable layer 18 can be obtained through repeated tests by the person skilled in the art.

So as to allow the first window structure 22 to be easily detachable from the touch screen 14, on the other hand, an adhesion reduction layer 16 is formed on top of the touch screen 14. The adhesion reduction layer 16 serves to lower a friction force and thus to increase a slip property thereof. Through the formation of the adhesion reduction layer 16, the first window structure 22 is easily detachable from the touch screen 14. The adhesion reduction layer 16 is a coating material made of a fluorocarbon resin or silicone resin. The adhesion reduction layer 16 is formed with a vacuum deposition layer made of titania $TiO_2$ or silica $SiO_2$ and a fluorocarbon resin or silicone resin coated on the vacuum deposition layer. At this time, the fluorocarbon resin or silicone resin is formed by means of ECC (Easy Cleaning Coating). Through the formation of the adhesion reduction layer 16, the generation of air bubbles can be more effectively suppressed upon the attachment of the window 20 to the touch screen 14. Through the formation of the adhesion reduction layer 16, further, the first window structure 22 can be easily detachably attached to the touch screen 14 by means of a consumer, without having any separate tool.

If the detachable layer 18 has the adhesion strength in the range of 0.1 to 500 gf/25 mm, it has self adhesion strength. Through the self adhesion strength, only if the detachable layer 18 is placed just on the touch screen 14, it is attached thereto by itself, without having any air bubbles. On the other hand, if the adhesion reduction layer 16 is applied to the touch screen 14, the detachable layer 18 has more improved self adhesion strength than that having no adhesion reduction layer 16.

According to the present invention, the adhesion strength of the detachable layer 18 is varied in accordance with the existence of the adhesion reduction layer 16. If there is the adhesion reduction layer 16, the detachable layer 18 has the adhesion strength in the range of about 0.5 to 500 gf/25 mm, but if there is no adhesion reduction layer 16, the detachable layer 18 has the adhesion strength in the range of 0.1 to 200 gf/25 mm. Under the condition where the detachable layers 18 have the same materials and thicknesses as each other, if the adhesion reduction layer 16 is formed on the touch screen 14 to which any one of the detachable layers 18 is attached, the first window structure 22 is more easily attached to the touch screen 14, without having air bubbles, when compared with that of the display device having no adhesion reduction layer 16. Through the formation of the adhesion reduction layer 16, also, the first window structure 22 is easily detachable from the touch screen 14.

According to the present invention, the first window structure 22 is separately manufactured and thus protected by a release film. The release film is removed from the first window structure 22 so as to attach the first window structure 22 to the touch screen 14 or the adhesion reduction layer 16. If the release film is removed, the detachable layer 18 is exposed to the outside. If the first window structure 22 in which the detachable layer 18 is exposed to the outside is attached to the touch screen 14 or the adhesion reduction layer 16 in a manual operation, the window 20 is mounted on the display 10. Further, if the window 20 is broken or exchanged with new one, the first window structure 22 is separated from the display 10 in a manual operation, and next, a new first window structure 22 is attached thereto.

Figure 4:
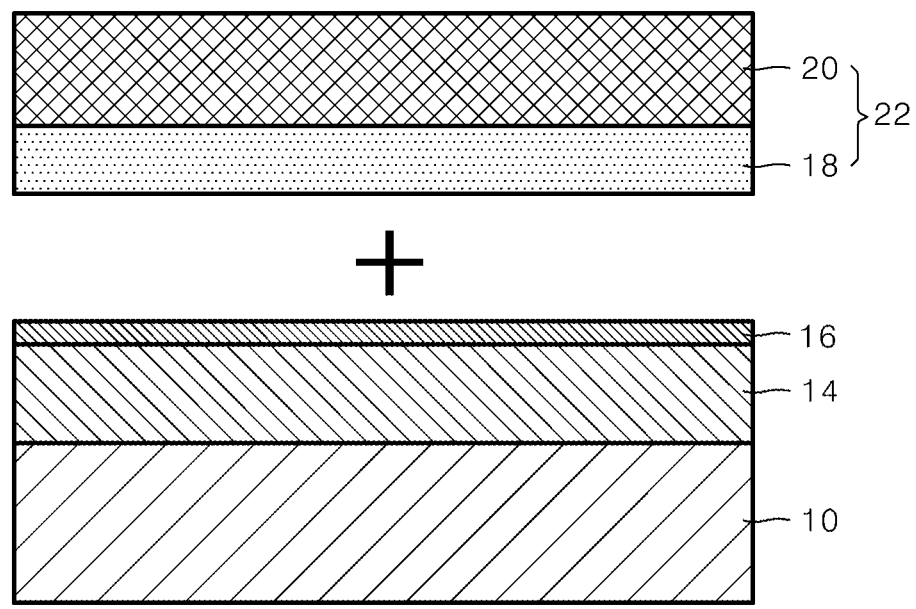
FIG. 4 is a schematic sectional view showing a display device according to a second embodiment of the present invention, wherein the display device has a first window structure detachably attached thereto.

FIG. 4 is a schematic sectional view showing a display device 200 according to a second embodiment of the present invention, wherein the display device 200 has a first window structure 22 detachably attached thereto. Of course, FIG. 4 is not an accurate sectional view showing the display device 200 according to the second embodiment of the present invention, and for the brevity of the description, further, the display device 200 may have components not indicated on the sectional view thereof. At this time, the display device 200 is the same as the display device 100 except that it does not have any adhesive layer 12. Hereinafter, the repeated explanation on the corresponding parts in the above-mentioned description will be avoided or briefly given.

As shown in FIG. 4, the display device 200 according to the second embodiment of the present invention includes a display 10, a touch screen 14, and a first window structure 22 sequentially laminated on one another, and the first window structure 22 includes a detachable layer 18 and a window 20. At this time, the touch screen 14 is a conductive pattern formed directly on the display 10. That is, the touch screen 14 is formed with the conductive pattern formed on the display 10. If the detachable layer 18 is made of a transparent material, it is not limited particularly. The detachable layer 18 is any one selected from an adhesive made by mixing thermosetting resin or ultraviolet curing resin as acrylic polymer, silicone polymer, or urethane polymer with a cross-linking agent, a mixture thereof, and a copolymer thereof. The detachable layer 18 is a single layer or multiple layers having different materials from each other. The multiple layers are made of appropriate materials in accordance with the use environments of the detachable layer 18. The detachable layer 18 has a given thickness desirably in the range of 10 to 200 μm so that it can be attached well to the touch screen 14. Of course, it is obvious that the thickness of the detachable layer 18 can be obtained through repeated tests by the person skilled in the art.

In the same manner as the display device 100 according to the first embodiment of the present invention, the display device 200 according to the second embodiment of the present invention further has an adhesion reduction layer 16. The material and function of the adhesion reduction layer 16 are the same as in the display device 100. According to the present invention, the adhesion strength of the detachable layer 18 is varied in accordance with the existence of the adhesion reduction layer 16. If there is the adhesion reduction layer 16, the detachable layer 18 has the adhesion strength in the range of about 0.5 to 500 gf/25 mm, but if there is no adhesion reduction layer 16, the detachable layer 18 has the adhesion strength in the range of 0.1 to 200 gf/25 mm. Under the condition where the detachable layers 18 have the same materials and thicknesses as each other, if the adhesion reduction layer 16 is formed on the touch screen 14 to which any one of the detachable layers 18 is attached, the first window structure 22 is more easily attached to the touch screen 14, without having air bubbles, when compared with that of the display device having no adhesion reduction layer 16. Through the formation of the adhesion reduction layer 16, also, the first window structure 22 is easily detachable from the touch screen 14.

According to the present invention, even if not shown, additional components are disposed between the window 20 and the detachable layer 18 of the first window structure 22 so as to apply a variety of functions thereto. The additional components include an optically clear adhesive layer, an anti-scattering layer and so on. For example, an optically clear adhesive layer having a print layer is formed on the window 20, and a transparent synthetic resin film (for example, PET film) is attached to the optically clear adhesive layer. After that, the detachable layer 18 is formed on the transparent synthetic resin film. The additional components are well known to the art, and a detailed explanation on them will be avoided herein.

<Display Device Having a Second Window Structure Detachably Attached to a Touch Screen Cover Layer>

Figure 5:
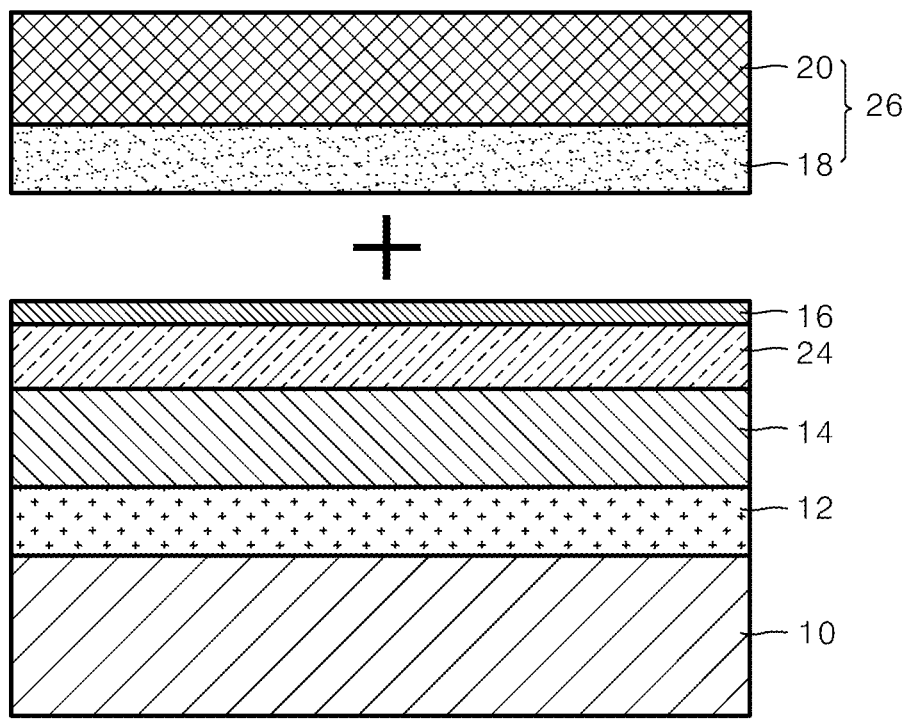
FIG. 5 is a schematic sectional view showing a display device according to a third embodiment of the present invention, wherein the display device has a second window structure detachably attached thereto.

FIG. 5 is a schematic sectional view showing a display device 300 according to a third embodiment of the present invention, wherein the display device 300 has a second window structure 26 detachably attached thereto. Of course, FIG. 5 is not an accurate sectional view showing the display device 300 according to the third embodiment of the present invention, and for the brevity of the description, further, the display device 300 may have components not indicated on the sectional view thereof. At this time, the display device 300 is the same as the display device 100 except that it includes a touch screen cover layer 24. Hereinafter, the repeated explanation on the corresponding parts in the above-mentioned description will be avoided or briefly given. At this time, the second window structure 26 also includes the additional components provided in the first window structure 22.

As shown in FIG. 5, the display device 300 according to the third embodiment of the present invention includes a display 10, an adhesive layer 12, a touch screen 14, a touch screen cover layer 24, a detachable layer 18, and a window 20 sequentially laminated on one another. Like the display device 200, on the other hand, the display device 300 may include the display 10 and the touch screen 14 directly bonded to each other, without having any adhesive layer 12. In this case, the touch screen cover layer 24 has a conductive pattern formed on the top or underside thereof so as to form the touch screen 14 thereon. Technically, the touch screen cover layer 24 is a portion of the touch screen 14. The touch screen cover layer 24 serves to prevent the touch screen 14 from being damaged due to impacts or contamination. Further, the display device 300 is configured wherein the conductive pattern is formed directly on the display 10 to form the touch screen 14 on the display 10, and at this time, the touch screen cover layer 24 is located on top of the display 10.

The touch screen cover layer 24 is covered with the second window structure 26 and thus located inside the display device 300. As the touch screen cover layer 24 is not exposed to the outside of the display device 300, accordingly, it can be prevented from the damages caused by impacts applied thereto. The touch screen cover layer 24 is a print layer or a functional coating layer and enhances the outer appearance of the display device 300 through various designs or a semi-transparent material. Further, the touch screen cover layer 24 serves to remove the influences caused by bending and steps made by a variety of patterns or circuits. If the influences caused by bending and steps disappear, the detachable attaching operation through the detachable layer 18 can be more easily carried out.

If the touch screen cover layer 24 is made of a transparent material, it is not limited particularly. For example, the touch screen cover layer 24 is any one selected from a glass substrate and a plastic substrate. In more detail, the glass substrate is a tempered glass substrate or an untempered glass substrate, and the plastic substrate is any one or more selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer). More desirably, the touch screen cover layer 24 includes the plastic substrate. The touch screen cover layer 24 is formed with a given thickness so as to prevent the touch screen 14 from being damaged while the display device 300 is being used.

In the same manner as the display device 100 according to the first embodiment of the present invention, the display device 300 according to the third embodiment of the present invention includes the adhesion reduction layer 16. The materials and functions of the adhesion reduction layer 16 are already explained when the display device 100 is described. According to the present invention, the adhesion strength of the detachable layer 18 is varied in accordance with the existence of the adhesion reduction layer 16. If there is the adhesion reduction layer 16, the detachable layer 18 has the adhesion strength in the range of about 0.5 to 500 gf/25 mm, but if there is no adhesion reduction layer 16, the detachable layer 18 has the adhesion strength in the range of 0.1 to 200 gf/25 mm. Under the condition where the detachable layers 18 have the same materials and thicknesses as each other, if the adhesion reduction layer 16 is formed on the touch screen 14 to which any one of the detachable layers 18 is attached, the second window structure 26 is more easily attached to the touch screen cover layer 2, without having air bubbles, when compared with that of the display device having no adhesion reduction layer 16. Through the formation of the adhesion reduction layer 16, also, the second window structure 26 is easily detachable from the touch screen cover layer 24.

If the detachable layer 18 has the adhesion strength in the range of 0.1 to 500 gf/25 mm, it has self adhesion strength. Through the self adhesion strength, only if the detachable layer 18 is placed just on the touch screen cover layer 24, it is attached thereto by itself, without having any air bubbles. On the other hand, if the adhesion reduction layer 16 is applied to the touch screen cover layer 24, the detachable layer 18 has more improved self adhesion strength than that having no adhesion reduction layer 16.

If the window structure is broken, a new window structure is selected and just attached to the touch screen, thereby simply finishing the exchanging operation thereof. In more detail, the broken window structure is separated from the touch screen, and a new second window structure is attached thereto. The exchanging operation of the window structure is carried out directly by a consumer, and the exchanging time is very short. Further, only the window structure is removed from the touch screen, which makes the display device easily recycled. Furthermore, the window structure is detachably attached to the touch screen, so that it can be easily attached thereto, without having any air bubbles. Only the parts of the display device excepting the window structure are made by a manufacturing company, and also, no adhesion process is required, so that the manufacturing process for the display device according to the present invention can be simple.

<Display Device Having a Third Window Structure Detachably Attached to a Display>

Figure 6:
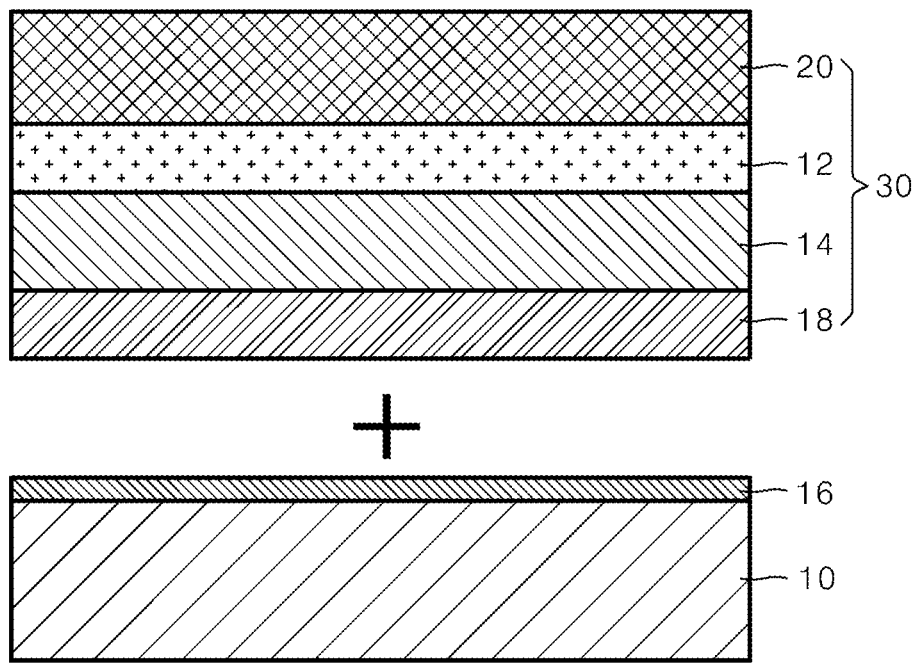
FIG. 6 is a schematic sectional view showing a display device according to a fourth embodiment of the present invention, wherein the display device has a third window structure detachably attached thereto.

FIG. 6 is a schematic sectional view showing a display device 400 according to a fourth embodiment of the present invention, wherein the display device 400 has a third window structure 30 detachably attached thereto. Of course, FIG. 6 is not an accurate sectional view showing the display device 400 according to the fourth embodiment of the present invention, and for the brevity of the description, further, the display device 400 may have components not indicated on the sectional view thereof. At this time, the display device 400 is the same as the display device 100 except that the positions of the respective layers are changed. Hereinafter, the repeated explanation on the corresponding parts in the above-mentioned description will be avoided or briefly given.

As shown in FIG. 6, the display device 400 according to the fourth embodiment of the present invention includes a display 10, a detachable layer 18, a touch screen 14, an adhesive layer 12, and a window 20 sequentially laminated on one another. At this time, the window 20, the adhesive layer 12, the touch screen 14 and the detachable layer 18 constitute the third window structure 30. The display 10 is selected from a liquid crystal display LCD, an organic light-emitting diode OLED, and an electronic paper display EPD, and utilizes quantum dots. The adhesive layer 12 is selected from, for example, a thermosetting adhesive and an ultraviolet curing adhesive. However, the adhesive layer 12 is not limited particularly, and may make use of OCA (optical clear adhesive). The touch screen 14 is made by forming a conductive pattern(s) on one side or both sides of an insulating layer made of a metal oxide or plastic. The insulation layer is generally made of the metal oxide such as ITO, ATO, ZnO, Cu, conductive polymer and silver nanowire.

According to the present invention, the third window structure 30 is detachably attached to the display 10 by means of the detachable layer 18. The detachable layer 18 is detachably attached to the display 10, while removing a release film therefrom. Like this, the detachable layer 18 is detachably attached to the display 10. If the detachable layer 18 is made of a transparent material, it is not limited particularly. The detachable layer 18 is any one selected from an adhesive made by mixing thermosetting resin or ultraviolet curing resin as acrylic polymer, silicone polymer, or urethane polymer with a cross-linking agent, a mixture thereof, and a copolymer thereof. The detachable layer 18 is a single layer or multiple layers having different materials from each other. The multiple layers are made of appropriate materials in accordance with the use environments of the detachable layer 18. The detachable layer 18 has a given thickness desirably in the range of 10 to 200 μm so that it can be attached well to the touch screen 14. Of course, it is obvious that the thickness of the detachable layer 18 can be obtained through repeated tests by the person skilled in the art.

So as to allow the third window structure 30 to be easily detachable from the display 10, on the other hand, an adhesion reduction layer 16 is formed on top of the display 10. The adhesion reduction layer 16 serves to increase a contact angle and thus to improve a slip property thereof. Through the formation of the adhesion reduction layer 16, the third window structure 30 is easily detachable from the display 10. The adhesion reduction layer 16 is a coating material made of a fluorocarbon resin or silicone resin. The adhesion reduction layer 16 may be formed with a vacuum deposition layer made of titania $TiO_2$ or silica $SiO_2$ and a fluorocarbon resin or silicone resin coated on the vacuum deposition layer. At this time, the fluorocarbon resin or silicone resin is formed by means of ECC (Easy Cleaning Coating). Through the formation of the adhesion reduction layer 16, the generation of air bubbles can be more effectively suppressed upon the attachment of the window 20 to the display 10. Through the formation of the adhesion reduction layer 16, further, the third window structure 30 can be easily detachably attached to the display 10 by a consumer, without having any separate tool.

If the detachable layer 18 has the adhesion strength in the range of 0.1 to 500 gf/25 mm, it has self adhesion strength. Through the self adhesion strength, only if the detachable layer 18 is placed just on the display 10, it is attached thereto by itself, without having any air bubbles. On the other hand, if the adhesion reduction layer 16 is applied to the display 10, the detachable layer 18 has more improved self adhesion strength than that having no adhesion reduction layer 16.

According to the present invention, the adhesion strength of the detachable layer 18 is varied in accordance with the existence of the adhesion reduction layer 16. If there is the adhesion reduction layer 16, the detachable layer 18 has the adhesion strength in the range of about 0.5 to 500 gf/25 mm, but if there is no adhesion reduction layer 16, the detachable layer 18 has the adhesion strength in the range of 0.1 to 200 gf/25 mm. Under the condition where the detachable layers 18 have the same materials and thicknesses as each other, if the adhesion reduction layer 16 is formed on the touch screen 14 to which any one of the detachable layers 18 is attached, the third window structure 30 is more easily attached to the display 10, without having air bubbles, when compared with that of the display device having no adhesion reduction layer 16. Through the formation of the adhesion reduction layer 16, also, the third window structure 30 is easily detachable from the display 10.

According to the present invention, the third window structure 30 is separately manufactured and thus protected by a release film. The release film is removed from the third window structure 30 so as to attach the third window structure 30 to the display 10. If the release film is removed, the detachable layer 18 is exposed to the outside. If the third window structure 30 in which the detachable layer 18 is exposed to the outside is attached to the display 10 in a manual operation, the window 20 is mounted on the display 10. Accordingly, the precise attaching operation carried out in the conventional practices is not required anymore. Further, if the third window structure 30 is broken or exchanged with new one, it is separated from the display 10 in a manual operation, and next, a new third window structure 30 is attached thereto.

<Display Device Having a Fourth Window Structure Detachably Attached to a Display>

Figure 7:
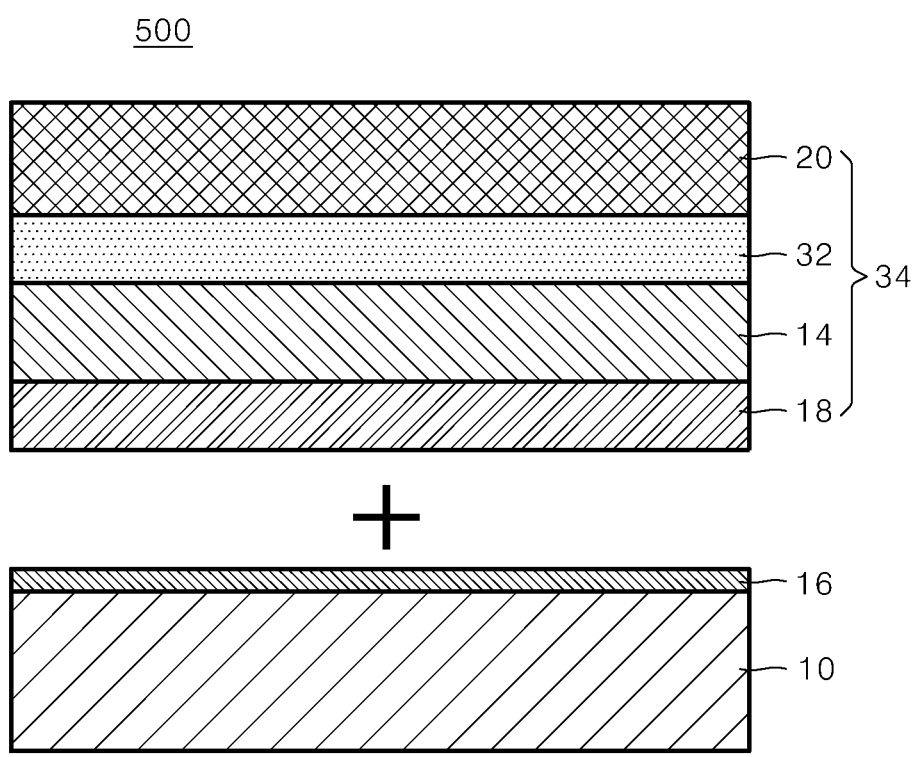
FIG. 7 is a schematic sectional view showing a display device according to a fifth embodiment of the present invention, wherein the display device has a fourth window structure detachably attached thereto.

FIG. 7 is a schematic sectional view showing a display device 500 according to a fifth embodiment of the present invention, wherein the display device 500 has a fourth window structure 34 detachably attached thereto. Of course, FIG. 7 is not an accurate sectional view showing the display device 500 according to the fifth embodiment of the present invention, and for the brevity of the description, further, the display device 500 may have components not indicated on the sectional view thereof. At this time, the display device 500 is the same as the display device 100 except that the adhesive layer 12 is replaced with a detachable layer 32. Hereinafter, the repeated explanation on the corresponding parts in the above-mentioned description will be avoided or briefly given.

As shown in FIG. 7, the display device 500 according to the fifth embodiment of the present invention includes a display 10, a detachable layer 18, a touch screen 14, a detachable layer 32, and a window 20 sequentially laminated on one another. At this time, the window 20, the detachable layer 32, the touch screen 14 and the detachable layer 18 constitute the fourth window structure 34. In this case, the detachable layer 18 and the detachable layer 32 have the same functions as each other, but they are located on different positions from each other, so that they have different reference numerals. The fourth window structure 34 is detachably attached to the display 10 by means of the detachable layer 18. The detachable layer 18 is detachably attached to the display 10, while removing a release film therefrom. Further, the fourth window structure 34 is detachably attached to the touch screen 14 by means of the detachable layer 32. That is, the fourth window structure 34 have the detachable layer 18 and the detachable layer 32 detachably attached correspondingly to the display 10 and the touch screen 14.

If the detachable layer 18 and the detachable layer 32 are made of a transparent material, they are not limited particularly. Each detachable layer is any one selected from an adhesive made by mixing thermosetting resin or ultraviolet curing resin as acrylic polymer, silicone polymer, or urethane polymer with a cross-linking agent, a mixture thereof, and a copolymer thereof. Each of the detachable layer 18 and the detachable layer 32 is a single layer or multiple layers having different materials from each other. The multiple layers are made of appropriate materials in accordance with the use environments of the detachable layer 18 and the detachable layer 32. The detachable layer 18 and the detachable layer 32 have a given thickness desirably in the range of 10 to 200 μm so that they can be attached well to the display 10 and the touch screen 14. Of course, it is obvious that their thickness can be obtained through repeated tests by the person skilled in the art.

According to the present invention, even if not shown, additional components are disposed on any one or both positions between the window 20 and the detachable layer 32 of the fourth window structure 32 and between the touch screen 14 and the detachable layer 18 thereof so as to apply a variety of functions thereto. The additional components include an optically clear adhesive layer, an anti-scattering layer and so on. If necessary, a print layer and a functional coating layer are formed appropriately. For example, an optically clear adhesive layer having a print layer is formed on the touch screen 14, and a transparent synthetic resin film (for example, PET film) is attached to the optically clear adhesive layer. After that, the detachable layer 18 is formed on the transparent synthetic resin film. The additional components are well known to the art, and a detailed explanation on them will be avoided herein.

<Display Device Having a Fifth Window Structure Detachably Attached to a Display>

Figure 8:
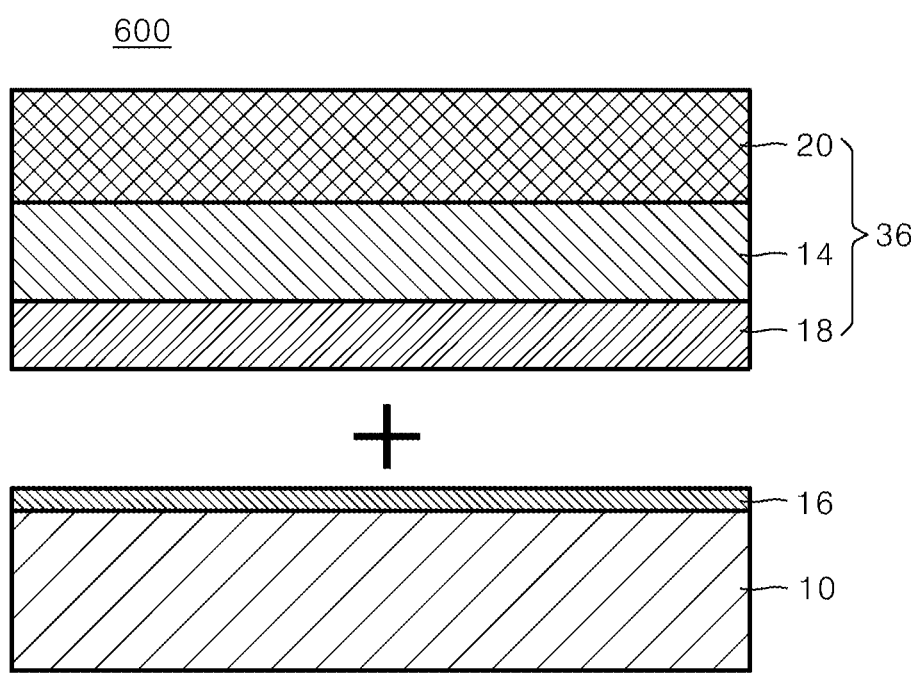
FIG. 8 is a schematic sectional view showing a display device according to a sixth embodiment of the present invention, wherein the display device has a fifth window structure detachably attached thereto.

FIG. 8 is a schematic sectional view showing a display device 600 according to a sixth embodiment of the present invention, wherein the display device 600 has a fifth window structure 36 detachably attached thereto. Of course, FIG. 8 is not an accurate sectional view showing the display device 600 according to the sixth embodiment of the present invention, and for the brevity of the description, further, the display device 600 may have components not indicated on the sectional view thereof. At this time, the display device 600 is the same as the display device 400 except that there is no adhesive layer 12. Hereinafter, the repeated explanation on the corresponding parts in the above-mentioned description will be avoided or briefly given. At this time, the fifth window structure 36 also includes the additional components provided in the third window structure 30.

As shown in FIG. 8, the display device 600 according to the sixth embodiment of the present invention includes a display 10, a detachable layer 18, a touch screen 14, and a window 20 sequentially laminated on one another. At this time, the window 20, the touch screen 14 and the detachable layer 18 constitute the fifth window structure 36. In this case, the touch screen 14 is a conductive pattern formed directly on the underside of the window 20. That is, the touch screen 14 is formed with the conductive pattern formed on the window 20. If the detachable layer 18 is made of a transparent material, it is not limited particularly. The detachable layer 18 is any one selected from an adhesive made by mixing thermosetting resin or ultraviolet curing resin as acrylic polymer, silicone polymer, or urethane polymer with a cross-linking agent, a mixture thereof, and a copolymer thereof. The detachable layer 18 is a single layer or multiple layers having different materials from each other. The multiple layers are made of appropriate materials in accordance with the use environments of the detachable layer 18. The detachable layer 18 has a given thickness desirably in the range of 10 to 200 μm so that it can be attached well to the touch screen 14. Of course, it is obvious that the thickness of the detachable layer 18 can be obtained through repeated tests by the person skilled in the art.

In the same manner as the display device 400 according to the fifth embodiment of the present invention, the display device 600 according to the sixth embodiment of the present invention also includes the adhesion reduction layer 16. The materials and functions of the adhesion reduction layer 16 are already explained when the display device 400 is described. According to the present invention, the adhesion strength of the detachable layer 18 is varied in accordance with the existence of the adhesion reduction layer 16. If there is the adhesion reduction layer 16, the detachable layer 18 has the adhesion strength in the range of about 0.5 to 500 gf/25 mm, but if there is no adhesion reduction layer 16, the detachable layer 18 has the adhesion strength in the range of 0.1 to 200 gf/25 mm. Under the condition where the detachable layers 18 have the same materials and thicknesses as each other, if the adhesion reduction layer 16 is formed on the touch screen 14 to which any one of the detachable layers 18 is attached, the fifth window structure 35 is more easily attached to the display 10, without having air bubbles, when compared with that of the display device having no adhesion reduction layer 16. Through the formation of the adhesion reduction layer 16, also, the fifth window structure 35 is easily detachable from the display 10.

If the detachable layer 18 has the adhesion strength in the range of 0.1 to 500 gf/25 mm, it has self adhesion strength. Through the self adhesion strength, only if the detachable layer 18 is placed just on the display 10, it is attached thereto by itself, without having any air bubbles. On the other hand, if the adhesion reduction layer 16 is applied to the display 10, the detachable layer 18 has more improved self adhesion strength than that having no adhesion reduction layer 16.

If each of the first to fifth window structures 22, 26, 30, 34 and 35 is applied to the display device according to the present invention, ground portions are formed on given areas of the display 10 and the touch screen 14 in such a manner as to face each other. So as to form the ground portions, a portion of the detachable layer 18 formed on the touch screen 14 is removed. If each of the first to fifth window structures 22, 26, 30, 34 and 35 is attached to the touch screen 14 or the display 10, the ground portions are connected to each other, thereby conducting the grounding for each of the display devices 100, 200, 300, 400, 500 and 600.

If the window structure of each display device according to the present invention is broken, a new window structure is selected and just attached to the touch screen or display, thereby simply finishing the exchanging operation thereof. In more detail, the broken window structure is separated from the touch screen or display, and a new window structure is attached thereto. The exchanging operation of the window structure is carried out directly by a consumer, and the exchanging time is very short. Further, only the window structure is removed from the touch screen or display, which makes the display device easily recycled. Furthermore, the window structure is detachably attached to the touch screen or display by means of adhesion, so that it can be easily attached thereto, without having any air bubbles. Only the parts of the display device excepting the window structure are made by a manufacturing company, and also, no adhesion process is required, so that the manufacturing process can be simple. Especially, if the adhesion reduction layer exists, it is easier to attach the window structure to the touch screen or display, without having any air bubbles, and through the formation of the adhesion reduction layer, further, the wind structure is easily separable from the touch screen or display.

Figure 9:
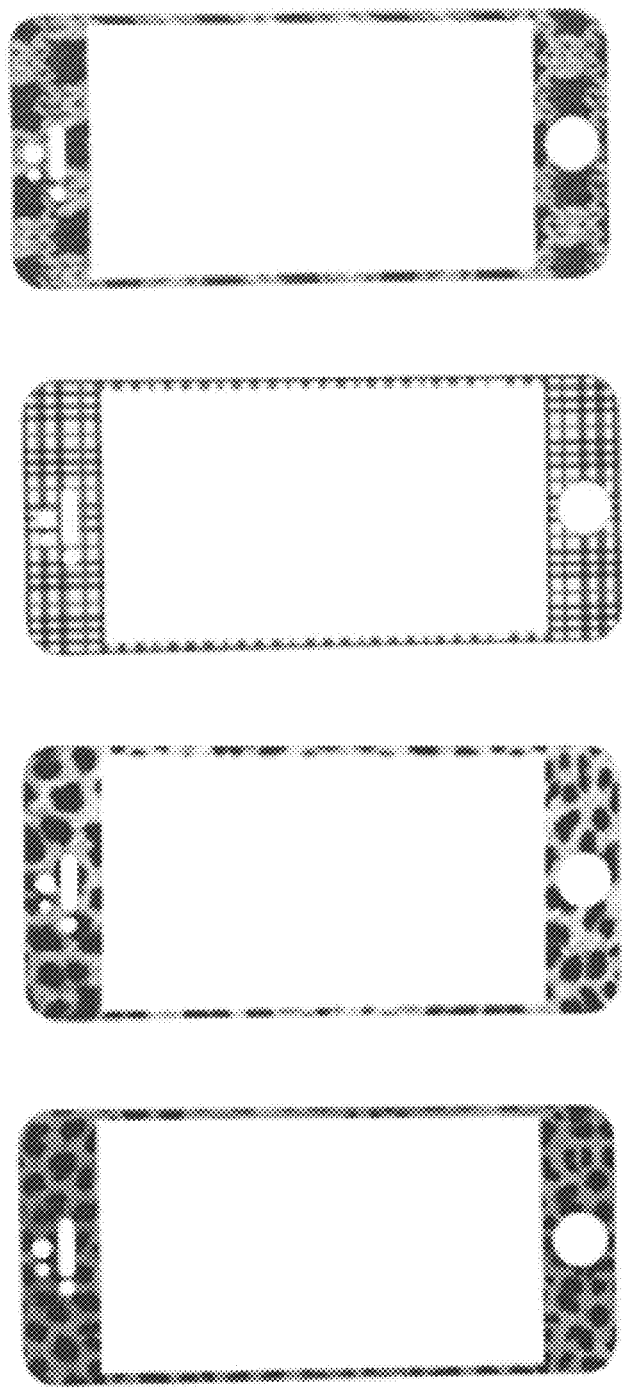
FIG. 9 is a schematic view showing the outer appearances of the display devices according to the embodiments of the present invention.

FIG. 9 is a schematic view showing the outer appearances of the display devices according to the embodiments of the present invention. For example, the display devices are mobile devices, and of course, they may be applied to other devices within the technical scope of the present invention.

As shown in FIG. 9, the outer appearances of the display devices according to the present invention can be designed diversely. That is, the display devices according to the present invention can be designed with good appearances and various colors and patterns. After the original window structure is separated from the display device, in this case, if a new window structure is attached to the display device, the outer appearance of the window structure can be changed to that with a consumer's desired design. So as to change the design of the window structure in the conventional practices, the adhesion of the window structure is removed, and a new window structure is again bonded to the display. In case of the display device according to the present invention, by the way, the existing window structure is removed from the display, and a new window structure is detachably attached thereto, so that the design of the display device can be changed simply. Unlike the window structure in the conventional practices, the window structure in the present invention is not a necessary item fixed to the display device, but a consumable item detachably attached to the display device if needed. Through the variety of designs, the after services for the respective designs, which are conducted one by one by the manufacturing company of the display device, are not needed anymore.

As described above, the display device and the manufacturing method according to the present invention are configured wherein the window structure including the detachable layer having the adhesion strength in the range of 0.1 to 500 gf/25 mm is detachably attached to the display device, so that when the window structure is damaged, it can be easily exchanged with new one, and also, the separation of the window structure is simple. According to the present invention, further, the detachable layer has self adhesion strength, so that it can be easily detachably attached to the display device, without having any air bubbles. Accordingly, the display device according to the present invention is manufactured with simple processes, low manufacturing cost and various designs, thereby satisfying the needs of the consumer. Furthermore, the window structure is easily exchanged with new one by means of the detachment and attachment thereof, so that it can be not a necessary item fixed to the display device, but a consumable item detachably attached to the display device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, separate means like grooves are formed on an injection molded body of the display device according to the present invention so as to allow the window structure to be more easily detachably attached to the display device.

What is claimed is:

1. A display device comprising:
   a window structure having a window and a detachable layer formed on an entire surface of one side of the window, the detachable layer having an adhesion strength in a range of 0.1 to 500 gf/25 mm; and
   an attachment target device detachably attached on the detachable layer of the window structure, wherein the window structure is entirely detachable from the attachment target device by means of the detachable layer,
   wherein the attachment target device comprises: a touch screen and an adhesion reduction layer formed on the touch screen, the detachable layer of the window structure being detachably attached to the adhesion reduction layer, or wherein the attachment target device comprises: a touch screen, a touch screen cover layer on the touch screen, and an adhesion reduction layer formed on the touch screen cover layer, the detachable layer of the window structure being detachably attached on the adhesion reduction layer.

2. The display device according to claim 1, wherein the window comprises: a glass substrate or a plastic substrate.

3. The display device according to claim 1, wherein the window comprises: a tempered glass substrate or a plastic substrate, the plastic substrate being formed of at least one selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer).

4. The display device according to claim 1, wherein the detachable layer is formed of any one selected from an adhesive made by mixing thermosetting resin or ultraviolet curing resin as acrylic polymer, silicone polymer, or urethane polymer with a cross-linking agent, a mixture thereof, and a copolymer thereof.

5. The display device according to claim 1, wherein the detachable layer is formed of a single layer, or multiple layers having different materials from each other.

6. The display device according to claim 1, wherein the touch screen includes a conductive pattern formed on a display.

7. The display device according to claim 1, wherein the touch screen is formed on a display, and the touch screen includes a conductive pattern.

8. The display device according to claim 1, wherein the touch screen cover layer is formed of any one selected from a tempered glass substrate, an untempered glass substrate, and a plastic substrate, the plastic substrate being formed of at least one selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer).

9. The display device according to claim 1, wherein the adhesion reduction layer is coated with a fluorocarbon resin or a silicone resin.

10. The display device according to claim 1, wherein the adhesion reduction layer is formed of a layer made of titania ($TiO_2$) or silica ($SiO_2$), a fluorocarbon resin or a silicone resin being coated on the layer.

11. The display device according to claim 1, wherein the adhesion reduction layer is configured to reduce an adhering force with the detachable layer to a range of 0.5 to 500 gf/25 mm.

12. The display device according to claim 1, wherein the window structure has a shape, a color or a pattern.

13. A display device comprising:
a window structure having a touch screen, a window formed on one side surface of the touch screen, and a detachable layer formed on the other side surface of the touch screen, the detachable layer having an adhesion strength in a range of 0.1 to 500 gf/25 mm; and
a display detachably attached on the detachable layer, wherein the window structure is able to be entirely detached from the display by means of the detachable layer,
wherein the display has an adhesion reduction layer formed thereon to reduce an adhering force with the detachable layer of the window structure.

14. The display device according to claim 13, wherein the window comprises: a glass substrate or a plastic substrate.

15. The display device according to claim 13, wherein the window comprises: a tempered glass substrate or a plastic substrate, the plastic substrate being formed of at least one selected from the group consisting of PET (polyethylene terephthalate), PEN (polyethylene naphthalate), PES (polyether sulfone), PI (polyimide), PAR (polyarylate), PC (polycarbonate), PMMA (polymethyl methacrylate), and COC (cycloolefin copolymer).

16. The display device according to claim 13, wherein the detachable layer is formed of any one selected from an adhesive made by mixing thermosetting resin or ultraviolet curing resin as acrylic polymer, silicone polymer, or urethane polymer with a cross-linking agent, a mixture thereof, and a copolymer thereof.

17. The display device according to claim 13, wherein the detachable layer is formed of a single layer or multiple layers having different materials from each other.

18. The display device according to claim 13, wherein the window structure has a shape, a color or a pattern.

19. The display device according to claim 13, wherein the adhesion reduction layer is coated with a fluorocarbon resin or a silicone resin.

* * * * *